United States Patent Office 3,463,987
Patented Aug. 26, 1969

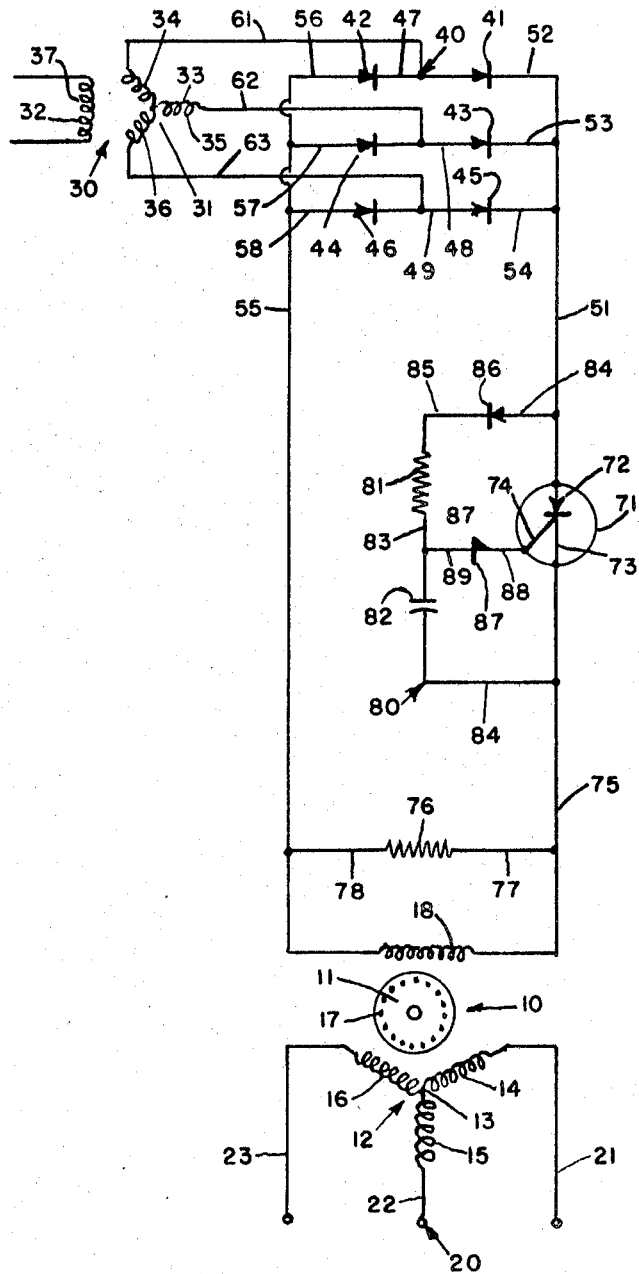

3,463,987
CONTROL FOR SYNCHRONOUS MOTORS UTILIZING A PERMANENTLY CONNECTED RESISTOR ACROSS THE FIELD WINDING
David W. Schlicher, Richfield, and Thomas G. Rohner, Minneapolis, Minn., assignors to Electric Machinery Mfg. Company, Minneapolis, Minn., a corporation of Minnesota
Filed Mar. 9, 1967, Ser. No. 621,898
Int. Cl. H02p 5/28
U.S. Cl. 318—176
2 Claims

ABSTRACT OF THE DISCLOSURE

A control for automatically exciting the field winding of a synchronous motor when proper speed is obtained and for de-energizing the same in the event the motor pulls out of synchronism. A trigger valve in the exciter circuit actuated by a timing circuit excites the field winding and also energizes a field discharge resistor permanently connected across the field winding.

In the drawing the single figure is a wiring diagram of a three phase motor and exciter therefor together with the control constituting the subject matter of the instant invention.

The invention is illustrated as used in conjunction with a polyphase synchronous moor 10 having a rotor 11 and a stator 12. The stator 12 includes a polyphase winding 13 illustrated in the drawings as a three phase winding. This winding has three sections 15, 16 and 17, one for each phase and which are connected in wye. The sections 14, 15, and 16 are connected to the conductors 21, 22 and 23 of a three phase power line 20. The rotor 11 of the motor includes an amortisseur winding 17 and a field winding 18. Such construction being well known in the art has only been shown diagrammatically, though it will be readily comprehended that the invention may be employed with any tpe of synchronous motor.

For procuring direct current for energizing the field winding 18 of motor 10 a full wave three phase rectifier 40 is employed which is energized by an exciter 30. The exciter 30 comprises a rotor 31 and a stator 32. The rotor 31 has a three phase winding 33 which includes three sections 34, 35 and 36. These sections are connected in wye. The stator 32 includes a field winding 37 which may be energized in any suitable manner as by means of a battery or by a source of direct current. Such construction being old in the art has not been shown in the drawing and the exciter has been shown only in diagrammatic form.

Operating in conjunction with the exciter 30 is the full wave rectifier 40. This rectifier includes diodes 41, 42, 43, 44, 45 and 46. The diodes 41 and 42 are connected together by a conductor 47, the diodes 43 and 44 by means of a conductor 48 and the diodes 45 and 46 by a conductor 49. The diodes 41, 43 and 45 are connected to a direct-current conductor 51 by means of conductors 52, 53 and 54, and the diodes 42, 44 and 46 are similarly connected to a companion conductor 55 by means of conductors 56, 57 and 58. The conductors 47, 48 and 49 are connected by means of conductors 61, 62 and 63 to the three sections 34, 35 and 36 of the exciter winding 33.

The invention proper includes a silicon controlled rectifier 71 having an anode 72, a cathode 73 and a gate 74. The anode 72 is connected to the conductor 51 while the cathode 73 is connected to one end of the field winding 18 of motor 10 by means of a conductor 75. The conductor 55 is connected to the other end of the field winding 18. Shunting the field winding 18 is a field discharge resistor 76 which is permanently connected by means of conductors 77 and 78 to the conductors 75 and 55. This resistor shunts the field winding 18 both during starting and running of the motor.

Shunting the silicon controlled rectifier 71 is a timing circuit 80. This circuit includes a resistor 81 and a capacitor 82 which are connected in series by means of a conductor 83. Capacitor 82 is further connected by means of a conductor 84 to the conductor 75 while resistor 81 is connected by means of a conductor 85 to a diode 86 which in turn is connected by means of a conductor 84 to conductor 51.

A trigger diode 87 is connected by means of a conductor 88 to the gate 74 of silicon controlled rectifier 71 and by means of a conductor 89 to conductor 83.

The operation of the invention is as follows:

In disuse exciter 30 is not energized and the circuit through the anode-cathode of rectifier 71 is open so no current from rectifier 40 passes through the field winding 18. Upon starting the motor both the exciter 30 and the winding 13 of motor 10 are energized. When the motor 10 is energized from line 20 an alternating current is produced in field winding 18 by transformer action between winding 13 and winding 18. This current flows through the discharge resistor 76 and creates a voltage drop which makes conductor 55 alternately positive and negative with respect to conductor 75. When conductor 55 is positive, current also flows through conductor 55, bridge rectifier 40, conductors 51 and 84, diode 86, resistor 81, conductor 83, capacitor 82, and conductor 84 to conductor 75. This pulse of current partially charges capacitor 82. During the half cycle when conductor 55 is negative, diode 86 prevents any current flow in the reverse direction which would discharge capacitor 82. Each succeeding positive pulse adds additional charge to said capacitor. The values of said capacitor and of resistor 81 are such that the voltage which is built up in said capacitor is just sufficient to actuate trigger diode 87 which passes current at a voltage great enough to actuate the gate 74, of silicon controlled rectifier 71 and fire said rectifier when the motor reaches substantially 95 percent full speed. Thus the capacitor is discharged and the silicon controlled rectifier passes current from the rectifier 40 to both the field winding 18 and resistor 76. The silicon controlled rectifier 71 having been fired continues to pass current until the motor gets out of step and the rotor 11 slows down. The transformer action between winding 13 and winding 18 then produces alternating current pulses of a polarity opposite to that produced by rectifier 40 and hence shuts off silicon controlled rectifier 71.

The advantages of the invention are manifest. An extremely simple and efficient construction is provided which can be produced at a low cost. For certain motors the field discharge resistor being continuously energized offers no particular problem and eliminates the switch means ordinarily used to open the field discharge resistor circuit when the motor is running normally.

Changes in the specific form of the invention, as herein described, may be made within the scope of what is claimed without departing from the spirit of the invention.

Having described the invention, what is claimed as new and desired to be protected by Letters Patent is:

1. A control for synchronous motors having a field winding and an exciter circuti therefor including a source of direct current, said control comprising:
    (a) a field discharge resistor shunting said field winding during running as well as starting of the motor, (b) a first trigger valve in said exciter circuit normally maintaining said exciter circuit open,
(c) a trigger circuit for said trigger valve,
(d) a second trigger valve in said trigger circuit,
(e) a timing circuit energized by the current induced in the field winding during speed build up of the rotor and including
(f) a resistor and a capacitor connected in series and energized by the induced field current,
(g) said trigger circuit being connected to said timing circuit at a locality between the resistor and capacitor and actuating said second trigger valve to trigger said first trigger valve and excite said field winding,
(h) said timing circuit further including a diode to prevent discharge from said capacitor during negative half-cycles of induced field current.

2. A control for synchronous motors according to claim 1 in which:
(a) the diode is connected in series with the resistor and is positioned adjacent the resistor.

References Cited
UNITED STATES PATENTS

| | | | |
|---|---|---|---|
| 3,293,518 | 12/1966 | Neumann | 318—176 |
| 3,350,613 | 10/1967 | Brockman et al. | 318—176 |
| 3,381,195 | 4/1968 | Hoffman | 318—174 |

ORIS L. RADER, Primary Examiner

G. Z. RUBINSON, Assistant Examiner

U.S. Cl. X.R.

318—181, 183, 193